United States Patent [19]
Starck

[11] Patent Number: 5,734,733
[45] Date of Patent: Mar. 31, 1998

[54] TELEVISION RECEIVER WITH INTEGRATED SPEAKERS

[75] Inventor: Philippe Starck, Issy les Moulineaux, France

[73] Assignee: Thomson Consumer Electronics S.A., Courbevoie, France

[21] Appl. No.: 832,171

[22] Filed: Apr. 2, 1997

Related U.S. Application Data

[63] Continuation of Ser. No. 321,201, Oct. 11, 1994.

[30] Foreign Application Priority Data

Oct. 18, 1993 [FR] France ................... 93 12378

[51] Int. Cl.⁶ ............................................. H04R 25/00
[52] U.S. Cl. ............................... 381/188; 381/205
[58] Field of Search ............................ 381/24, 87, 88, 381/89, 90, 159, 188, 205; 181/199; H04N 5/04

[56] References Cited

U.S. PATENT DOCUMENTS 4,365,114  12/1982  Soma ........................ 381/182

FOREIGN PATENT DOCUMENTS

| | | | |
|---|---|---|---|
| 492919 | 12/1991 | European Pat. Off. | H04R 5/02 |
| 2806580 | 11/1979 | Germany | H04N 5/60 |
| 3607987 | 9/1987 | Germany | H04N 5/640 |
| 3829278 | 3/1990 | Germany | H04N 5/640 |
| 4036152 | 5/1992 | Germany | H04R 1/20 |
| 5-145870 | 6/1993 | Japan | H04N 5/64 |
| 2102243 | 1/1983 | United Kingdom | H04R 5/02 |
| 2249454 | 5/1992 | United Kingdom | H04R 1/02 |

*Primary Examiner*—Huyen D. Le
*Attorney, Agent, or Firm*—Joseph S. Tripoli; Frederick A. Wein; Peter M. Emanuel

[57] ABSTRACT

This invention concerns a television receiver equipped with speakers fitted in a particular manner. The television receiver includes at least one speaker located at the bottom of a cavity in the outer surface of the case of said television receiver, this cavity being located in at least one of the faces of said case, said bottom and said speaker being oriented so that the sound from said speaker radiates at least partially towards the front of said television receiver, and said bottom of said cavity being close to the rear face of said case.

6 Claims, 1 Drawing Sheet

TELEVISION RECEIVER WITH INTEGRATED SPEAKERS

This is a continuation of application Ser. No. 08/321201, filed Oct. 11, 1994.

BACKGROUND OF THE INVENTION

This invention concerns a television receiver equipped with one or more speakers fitted in a particular manner. The invention is applicable, notably though not exclusively, when it is required to incorporate the speakers within the case of the receiver while limiting its overall size.

A number of arrangements of speakers exist in the prior art. For example, it is common to find two speakers mounted "ear-fashion" on the sides of the case, or inside the case one on each side of the screen, radiating their sound directly towards the viewer. A speaker fitted beneath the screen also radiates directly. In a third configuration, speakers are fitted in the sides of the receiver, the sound then radiating laterally to the left and right via orifices in the case.

These configurations have several disadvantages. In the first two configurations mentioned previously, although the speakers have the advantage of directly radiating the sound, they tend to significantly increase the size of the receiver. If we consider that the minimum dimension of the front face of the receiver is that of the screen (i.e. the cathode ray tube), the overall size of the front face is necessarily greater than this minimal size in these speaker configurations. This results in larger packaging and, when the speakers are mounted "ear-fashion", in increased vulnerability to damage since the speakers project from the case.

The third configuration mentioned above enables the front face to be minimized, but has poorer acoustic performance, since the sound is not radiated directly towards the viewer. In this case, the operating environment of the receiver is much more important than in the other configurations since reflections from objects to the sides of the receiver may reduce the sound received by the viewer. Similarly, if the receiver is placed on a shelf, objects placed on the shelf may obstruct the orifices in the case.

SUMMARY OF THE INVENTION

The present invention concerns a television receiver in which the speakers are positioned to minimize the disadvantages described above.

The object of the invention is a television receiver including one or more speakers located at the bottoms of one or more cavities in the outer surface of the case of said television receiver, these cavities being located in at least one of the faces of said case, said bottoms and said speakers being oriented so that the sound from said speakers radiates at least partially towards the front of said television receiver, and being positioned close to the rear face of said case.

In this configuration, the direction of radiation can easily be chosen to be non-lateral. A considerable fraction of the sound is radiated directly towards the viewer, the sound passing along the side of the case from the back towards the front. In addition, the magnets in the speakers are as far removed as possible from the frame deflecting coils of the cathode ray tube of the receiver, thus minimizing the perturbation of the electron beam.

In a particular embodiment, the said case has a substantially parallelepiped shape, possibly slightly tapered towards the rear.

In a particular embodiment, the said television receiver has two speakers housed in the two upper rear corners, the said cavities being located in the upper lateral edges of the said case, the bottom of these cavities being fitted with orifices facing the said speakers.

In a particular embodiment, the said cavities become more and more shallow as we approach the front of the receiver, in order to obstruct as little as possible the sound radiating from the speakers located in the bottoms of the cavities.

In a particular embodiment, the said cavities are made in the left and right surfaces or in the top surface of the case.

In a particular embodiment, the orientation of the said speakers can be adjusted by the user.

In a particular embodiment, the zone of the cavities including the sound orifices is attached to the speakers, enabling the orientation of the speakers to be adjusted from outside the case.

BRIEF DESCRIPTION OF THE DRAWINGS

Other characteristics and advantages of the invention will appear in the description that follows, which makes reference to the annexed drawings which represent.

DESCRIPTION OF THE INVENTION

Figure 1:
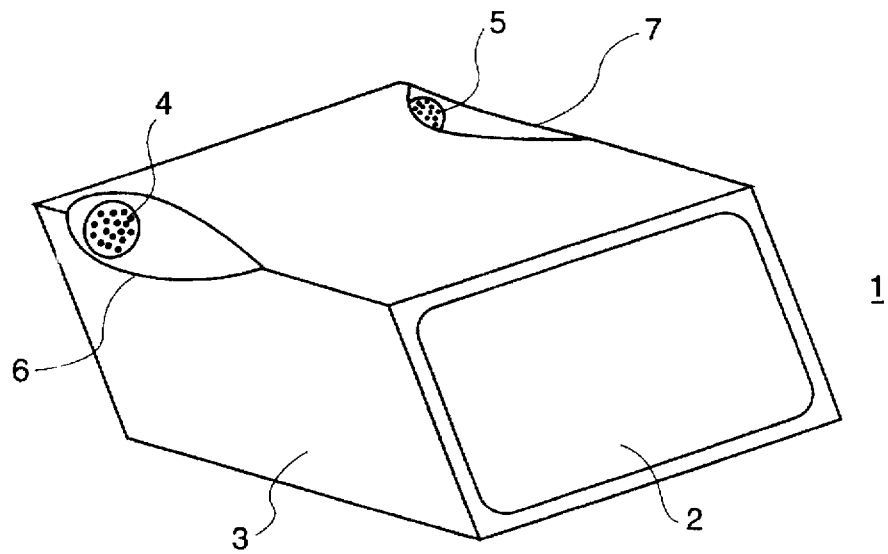
FIG. 1: a three-dimensional view of a television receiver according to the invention, fitted with two speakers.

In the example of the embodiment shown in FIG. 1, the television receiver 1 includes a cathode ray tube 2, a case 3 and cavities 6 and 7 made in the upper lateral edges of the case 3.

Figure 2:
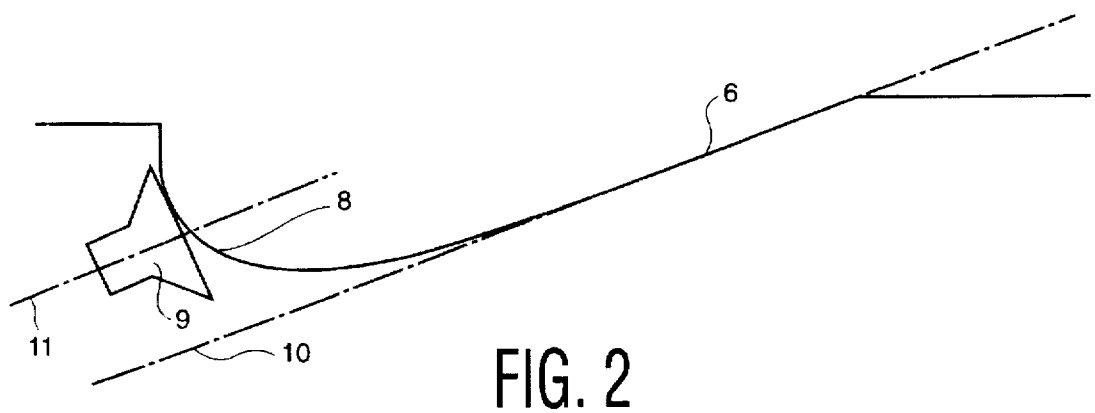
FIG. 2: a section of one of the cavities, along the diagonal 2—2 of the television receiver shown in FIG. 3.

Cavities 6 and 7, in the present embodiment and as shown in FIGS. 1 and 2, have the shape of a liquid droplet whose rounded end, constituting the bottom 8, is towards the rear of the case 3. As we move towards the front of the case 3, the cavity becomes shallower, and finally merges into the edge of the case. In this configuration, the cavities and their content remain invisible when looking from the front of the receiver. We note that the length and inclination of cavities 6 and 7 are limited mainly by the shape of the cathode ray tube 2.

The bottom of each cavity includes orifices delimited by areas 4 and 5 which allow the sound from the speakers to escape. These speakers are preferably mounted just behind the areas 4 and 5, using techniques known professionals of the art.

In the embodiment shown in FIG. 2, the axis 11 of the speaker is parallel to the generatrix 10 of the cavity 6, but other positions could be found depending on the type of speaker used. If we wish to make the speaker radiate sound more vertically above the receiver, it is also possible to place it lower in the cavity, i.e. towards the interior of the case, the orifices being appropriately positioned. It would also be possible to place several speakers in each cavity, each speaker radiating sound in a different direction.

Figure 3:
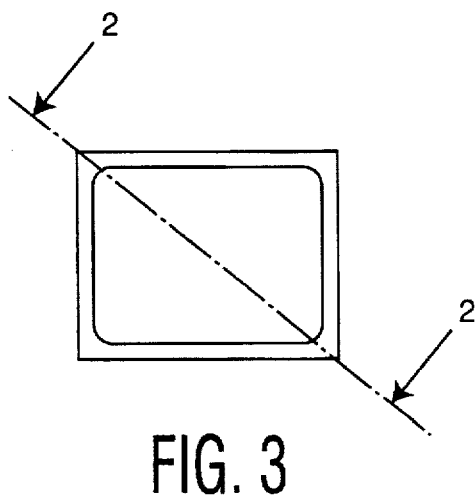
FIG. 3: the front face of the television receiver, indicating the section 2—2 shown in FIG. 2.

At least one of the loudspeakers 9 has an imaginary plane of symmetry which is perpendicular to the front face 2, with an intersection of the plane of symmetry with the front face 2 being a diagonal of the front face from an upper corner to a lower corner, one of such diagonals coinciding with line 2—2 of FIG. 3.

We see clearly in FIG. 1 that the arrangement of the speaker at the bottom of the cavities enables a compromise to be found between the lateral radiation and radiation directly towards the viewer, while minimizing the disadvantages of known speaker configurations.

This arrangement is particularly efficient acoustically since the speakers are not occulted by the cathode ray tube or, more generally, by the front face of the receiver. For this reason, the speakers and the bottoms of the cavities will be positioned as far back as possible on the receiver case, near the rear edge, which is facilitated by the generally parallelepiped shape of the case.

In a particular embodiment, the inclination of the speakers is adjustable, in which case we could attach the areas 4 and 5 of cavities 6 and 7 to the speakers to enable their inclination to be adjusted manually with one or two degrees of freedom without having to open the case 3.

In another embodiment, cavities 6 and 7 are made not on the lateral edges of the case but in the left and right surfaces or in the top surface of the case.

What is claimed is:

1. Television receiver having an outer case having a front face with a display screen, with four corners, a front upper right, a front upper left, a front bottom right and a front bottom left corner, the case including at least one loudspeaker having a plane of symmetry and located at a part of a cavity of the case, the cavity having a cavity face, the plane of symmetry of the at least one loudspeaker being perpendicular to the front face with an intersection of the plane of symmetry with the front face being a diagonal of the front face going from one of the upper left corner and upper right corner of the front face to the diagonally opposite bottom corner, said plane separating the cavity face into two substantially symmetrical parts around the plane, said cavity becomes more and more shallow towards the front of said case in order to avoid obstructing the sound radiating from said at least one speaker in said cavity.

2. Television receiver having an outer case having substantially a parallelepiped shape, a front face with a display screen, with four corners, a front upper right, a front upper left, a front bottom right and a front bottom left corner and an upper face, a right face, a left face and a bottom face, the case including at least one loudspeaker radiating at least partially toward the front face and, having a plane of symmetry and located at a rear part of a cavity of the case, the cavity having a cavity face located at the outer surface of the case, said cavity becoming gradually shallow towards the front face of the case, the plane of symmetry of the at least one loudspeaker being perpendicular to the front face with an intersection of the plane of symmetry with the front face being a diagonal of the front face going from one of the upper left corner and upper right corner of the front face to the diagonally opposite bottom corner, said plane separating the cavity face into two substantially symmetrical parts around the plane.

3. Television receiver according to claim 2, wherein the shape of said cavity is substantially that of a liquid droplet.

4. Television receiver according to claim 2, wherein the orientation of said at least one speaker can be adjusted by a user.

5. Television receiver according to claim 2, wherein said cavity includes an orifice to allow the sound to escape.

6. Television receiver according to claim 5, wherein said orifice enables the orientation of said at least one speaker to be adjustable from the outside of said case.

* * * * *